United States Patent [19]

Bennett et al.

[11] 4,033,899
[45] July 5, 1977

[54] ALKYLATION FLUOSULFONIC-SULFURIC ACID CATALYST RECOVERY PROCESS WITH SILICA-ALUMINA REMOVAL OF FLUORIDE COMPOUNDS

[75] Inventors: Richard H. Bennett; Byron V. Klock; James W. Brockington, all of Richmond, Va.

[73] Assignee: Texaco Inc., New York, N.Y.

[22] Filed: Dec. 18, 1975

[21] Appl. No.: 641,804

Related U.S. Application Data

[63] Continuation-in-part of Ser. No. 537,631, Dec. 30, 1974, abandoned.

[52] U.S. Cl. .................. 252/420; 252/411 R; 260/683.63; 423/467; 423/484; 423/525; 423/531
[51] Int. Cl.² .................. B01J 37/00; C01B 17/46; C07C 3/54
[58] Field of Search .......... 252/420, 411; 260/683.63, 683.58, 683.62; 423/484, 540, 525, 528, 531

[56] References Cited

UNITED STATES PATENTS

| | | | |
|---|---|---|---|
| 2,387,162 | 10/1945 | Matuszak | 260/683.58 |
| 2,992,070 | 7/1961 | Henley | 423/528 |
| 2,993,757 | 7/1961 | Dasher et al. | 423/484 |
| 3,239,578 | 3/1966 | Samuelson | 260/683.58 |
| 3,677,701 | 7/1972 | Hollingsworth et al. | 423/483 |
| 3,766,293 | 10/1973 | Parker et al. | 260/683.58 |
| 3,773,917 | 11/1973 | Lewis et al. | 423/540 |
| 3,870,765 | 3/1975 | McCoy et al. | 260/683.63 |
| 3,922,319 | 11/1975 | Brockington | 260/683.63 |
| 3,925,318 | 12/1975 | Parker et al. | 260/683.58 |
| 3,957,959 | 5/1976 | Wheatly et al. | 423/467 |
| 3,976,759 | 8/1976 | Bennett et al. | 423/484 |

*Primary Examiner*—Winston A. Douglas
*Assistant Examiner*—P. E. Konopka
*Attorney, Agent, or Firm*—Thomas H. Whaley; Carl G. Ries; Douglas H. May, Jr.

[57] ABSTRACT

A process for removal of fluoride compounds from spent alkylation catalyst containing fluorosulfonic acid and sulfuric acid wherein said spent catalyst is hydrolyzed in the presence of water, at subatmospheric pressure in a vacuum digestion zone for conversion of a major portion of fluorosulfonic acid to hydrogen fluoride, wherein said hydrogen fluoride is removed from the vacuum digestion zone as a vapor, and wherein the remaining sulfuric acid rich liquid fraction of the spent catalyst is treated with silica-alumina cracking catalyst for removal of most of the remaining residual fluoride compounds for providing a sulfuric acid effluent substantially free of fluoride compounds. The hydrogen fluoride recovered is reacted with sulfur trioxide to form fresh fluorosulfonic acid which is combined with sulfuric acid to provide fresh alkylation catalyst.

5 Claims, 1 Drawing Figure

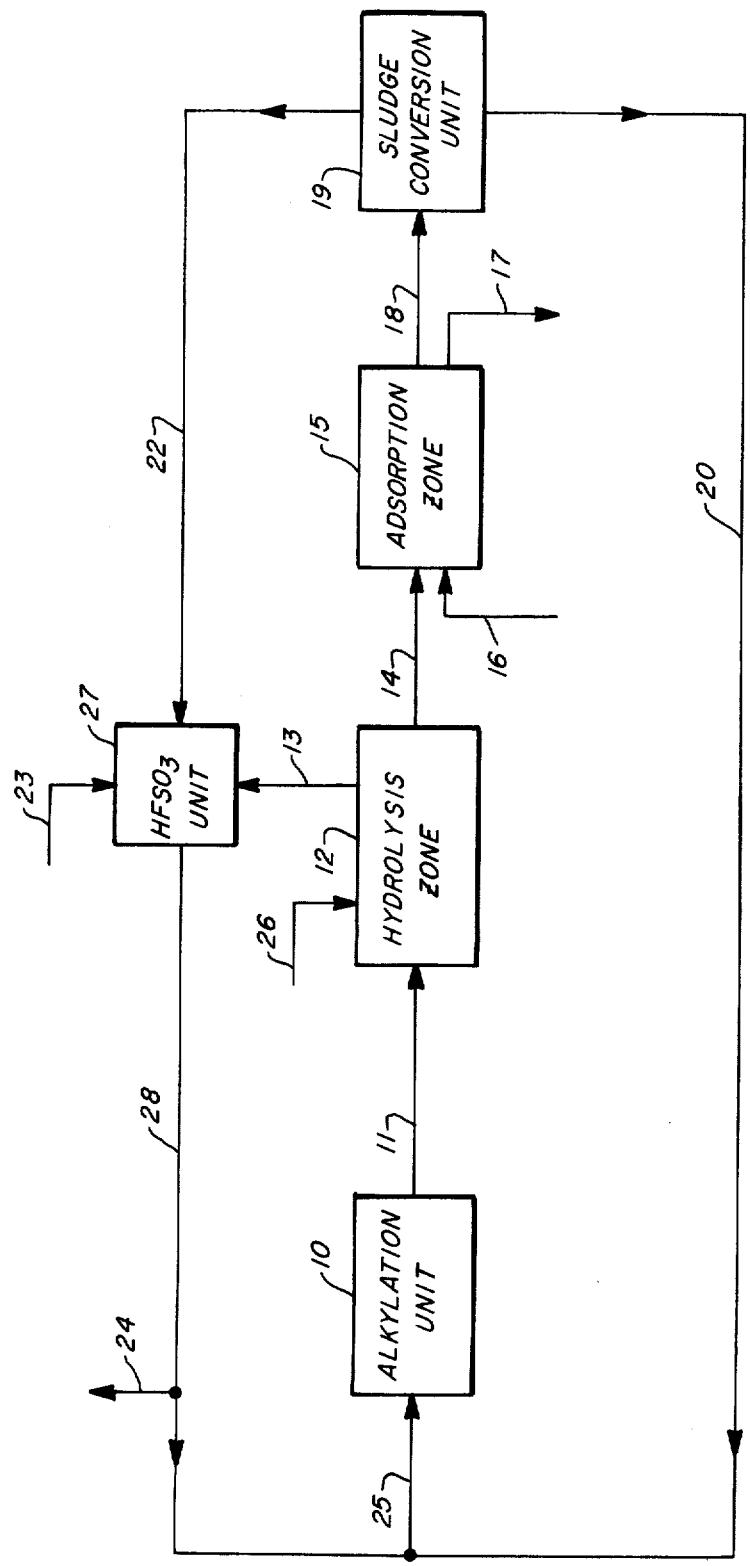

4,033,899

ALKYLATION FLUOSULFONIC-SULFURIC ACID CATALYST RECOVERY PROCESS WITH SILICA-ALUMINA REMOVAL OF FLUORIDE COMPOUNDS

This application is a Continuation-in-Part of application Ser. No. 537,631, filed Dec. 30, 1974, now abandoned.

BACKGROUND OF THE INVENTION

The present invention relates to a catalyst recovery process. More particularly, the present invention relates to a process for the removal of fluoride compounds from spent alkylation catalysts comprised of fluorosulfonic acid and sulfuric acid, and to the regeneration of fresh alkylation catalyst.

Liquid phase alkylation processes wherein an isoparaffin hydrocarbon, such as isobutane, isopentane, etc. are alkylated with olefin hydrocarbons such as propylene, butylenes, etc. for the production of alkylate products comprising highly branched $C_7$–$C_8$ range paraffin hydrocarbons having high octane value, are well known and widely practiced. In such processes, the reactant hydrocarbons are usually contacted in the liquid phase, at elevated temperatures in the presence of acid alkylation catalysts and under conditions of good mixing, reaction pressures usually being only sufficient to maintain the reactants in the liquid phase.

Although numerous acid catalysts may be employed in such alkylation processes, an effective catalyst comprises a mixture of sulfuric acid and fluorosulfonic acid. One such catalyst, particularly effective in the alkylation processes under consideration is disclosed in in the U.S. patent application Ser. No. 520,595, filed Nov. 4, 1974. The novel alkylation catalyst disclosed in the aforementioned application comprises fluorosulfonic acid and sulfuric acid in a weight ratio of from about 0.11/1 to about 0.32/1, respectively, the catalyst having a titratable acidity in the range of 16.6 to 21 milliequivalents per gram (meq/gm) and which may contain up to 3% by weight water and up to 10% by weight acid oils, the acid oils comprising relatively high molecular weight reaction products of sulfuric acid and hydrocarbons present in the process. In the process described in the aforementioned patent application, a $C_4$–$C_6$ isoparaffin hydrocarbon such as isobutane is contacted with a $C_3$–$C_5$ olefin hydrocarbon such as propylene, a butylene, or mixtures thereof, in a molar ratio of isoparaffin to olefin of from about 2/1 to 20/1, in the liquid phase, in the presence of the alkylation catalyst at a temperature in the range of from about 0° F to about 100° F. Reaction pressures employed may range from ambient to superatmospheric the pressure employed generally being sufficient to maintain the hydrocarbon reactants in the liquid phase. Since the reactants may be normally gaseous at alkylation reaction temperatures, reaction pressures generally range from about 10 to about 150 psig. Preferably, the alkylation reaction mixture is subjected to good mixing to form a hydrocarbon in continuous acid phase emulsion which comprises from about 40 to about 70 volume percent acid phase and from about 60 to about 30 volume percent hydrocarbon phase. Liquid volume ratios of isoparaffin hydrocarbons to olefin hydrocarbons of from about 2/1 to about 20/1 are generally employed in the process. Contact times for hydrocarbon reactants in the alkylation zone, in the presence of the alkylation catalyst, may range from about 0.5 to about 60 minutes. Preferably, the contact time is sufficient to ensure essentially complete conversion of olefin reactant in the alkylation zone. Such contact times are sufficient for providing an olefin space velocity in the range of about 0.1 to about 1.0 volumes olefin/hour/volume of catalyst. The process may be conducted batchwise or continuously. It has been found that use of the catalyst described in the aforementioned patent application, in alkylating $C_4$–$C_6$ isoparaffin with a $C_3$–$C_5$ mono-olefin, produces an alkylate of increased octane value over that obtained by prior art catalysts.

When using the above-described fluorosulfonic sulfuric acid alkylation catalyst, it is common practice to process the spent catalyst in such a fashion so as to regenerate fresh sulfuric acid, the major component of the catalyst. However, even though the fluorosulfonic acid is present as a minor component in the alkylation catalyst, because of its expense relative to that of sulfuric acid, it is desirable to recover, as well, the fluorosulfonic acid or any fluoro compounds which can be easily converted to the fluorosulfonic acid.

One method for recovering the sulfuric acid from the spent alkylation catalyst is to treat the spent catalyst in what is known as a sludge conversion unit. In such a unit the spent catalyst containing water and organic materials is charged to a furnace for oxidative conversion of all the sulfur species present to sulfur dioxide. The sulfur dioxide, in admixture with air, is then passed over a catalyst, e.g. $V_2O_5$ or some other such suitable oxidation catalyst, in a converter section of the unit to form $SO_3$. The $SO_3$ is then absorbed in a sulfuric acid solution to produce oleum which is then diluted with water to produce sulfuric acid of the desired concentration, i.e., 97–99 weight percent, for the alkylation catalyst. The furnaces used in such sludge conversion units employ refractories which are readily attacked by HF or HF precursors such as fluorosulfonic acid. For example, to prevent damage to refractory furnace linings, fluoride concentrations (calculated as HF) of about 10 ppmv or less are particularly desirable. At levels above about 10 ppmw, fluoride attack upon refractory lining is accelerated, thus shortening the operating lifetime of such materials in the sludge conversion unit. Over and above the potential damage to the refractories in the furnace, any HF in the converter section would volatilize the vanadium from the $V_2O_5$ oxidation catalyst. Accordingly, a process which effectively recovers the fluorosulfonic acid or precursors thereof from the spent catalyst and also provides a feed to the sludge conversion unit substantially free of damaging fluoro compounds is highly desirable.

Processes for removal of hydrogen fluoride, and fluorine compounds easily converted to hydrogen fluoride from liquid mixtures with sulfuric acid are known in the prior art. Such methods include heating the liquid mixtures, to boiling off hydrogen fluoride, as exemplified by processes taught in U.S. Pat. No. 2,993,757, Dasher et al, July 25, 1961. Another process for separation of fluorosulfonic acid from sulfuric acid is disclosed in U.S. Pat. No. 3,766,293; Parker et al, Oct. 16, 1973, wherein a spent alkylation catalyst is hydrolyzed with water for conversion of fluorosulfonic acid to hydrogen fluoride and sulfuric acid, wherein hydrogen fluoride is extracted from the hydrolysis mixture with a paraffinic hydrocarbon solvent, and wherein the hydrocarbon extract phase containing hydrogen fluoride is contacted with sulfur trioxide for conversion of the hydrogen fluoride to fluorosulfonic acid which may be returned as catalyst to the alkylation process.

Processes for removal of residual hydrogen fluoride and fluoride compounds from sulfuric acid by treatment with bauxite are disclosed in U.S. Pat. No. 3,239,578, Samuelson, Mar. 8, 1966; and in U.S. Pat. No. 2,387,162, Matuszak, Oct. 16, 1945.

SUMMARY OF THE INVENTION

According to one embodiment of the present invention, spent alkylation catalyst, comprised of fluorosulfonic acid and sulfuric acid, is subjected to a two-stage process to effect removal of most of the fluoride compounds from the spent catalyst so as to provide an acid effluent free of substantial amounts of fluoride compounds and suitable as a feed to a sludge conversion unit. In the first stage of the dual stage process, the spent catalyst is subjected to hydrolysis for conversion of fluorosulfonic acid to hydrogen fluoride and sulfuric acid. This hydrolysis reaction is conducted at subatmospheric pressure in a temperature range of from about 50° to about 120° C. and in admixture with at least the stoichometric amount of water necessary to hydrolyze the fluorosulfonic acid in the spent catalyst to hydrogen fluoride. A vapor or first fraction comprising primarily hydrogen fluoride mixed with some fluorosulfonic acid and $SO_2$ is recovered from the distillation zone for further processing. In the second stage (the adsorption zone) of the process, a liquid fraction recovered from the hydrolysis stage and comprising sulfuric acid, water and minor amounts of fluoride compounds remaining after removal of the first hydrogen fluoride vapor fraction is contacted with a silica-alumina cracking catalyst, in an amount and for a period of time sufficient to effect reaction of the bulk of the residual fluoro compounds with the cracking catalyst. An acid effluent, free of substantial amounts of fluoro compounds, containing substantially all of the sulfuric acid present in the spent acid, and suitable for charging to a sludge conversion unit is then recovered free of the fluoride containing cracking catalyst.

In another embodiment of the present invention, the above-described fluoro compound removal process is employed as part of an alkylation catalyst regeneration process. The hydrogen fluoride removed in the hydrolysis stage is reacted with $SO_3$ to form fluorosulfonic acid. Additionally, the acid effluent from the second stage is treated in the sludge conversion unit to ultimately produce fresh sulfuric acid which is then combined with the fluorosulfonic acid obtained from the first stage of the process to produce fresh alkylation catalyst.

BRIEF DESCRIPTION OF THE DRAWINGS

The single FIGURE is a schematic flow diagram of the process of the present invention.

DESCRIPTION OF THE PREFERRED EMBODIMENT

Reference is now made to the accompanying drawing for a more detailed description of the process of the present invention.

Spent alkylation catalyst from alkylation unit 10 passes via line 11 into hydrolysis zone 12, the primary treatment stage of the process. The spent catalyst from alkylation unit 10 comprises primarily sulfuric acid (about 88–90% by weight) and contains in addition, fluorosulfonic acid, ($\approx 15\%$ by volume) water (3–4% by weight), acid oils, sulfonated and fluorinated organic materials and other side reaction products formed in the alkylation reaction. Generally, the total fluoride content, measured as HF, is in the range of 15,000 to 30,000 ppmw (parts per million weight). Hydrolysis zone 12 is preferably operated at subatmospheric pressures and elevated temperatures of from about 50° to about 120° C. It is desirable that the apparatus of the hydrolysis zone be of a type which can generate a large surface area of spent catalyst, one such type of preferred apparatus being a multi-stage agitated vacuum digester.

As noted above, the hydrolysis is conducted in the presence of at least the stoichometric amount of water needed to hydrolyze the fluorosulfonic acid to hydrogen fluoride. Generally speaking, in spent alkylation catalyst the water content is from 3 to 4% by weight. Thus, in a typical spent alkylation catalyst, it is not necessary to add water to effect hydrolysis of the fluorosulfonic acid in the spent catalyst. As will be seen hereafter, however, conducting the hydrolysis step in the presence of a substantially stoichiometric excess of water, e.g. up to 15% by weight of the spent catalyst when fluoride content, measured as HF, is in the 15,000–30,000 ppmw range, greatly enhances fluoride removal in the hydrolysis zone. Accordingly, provision is made for adding water to hydrolysis zone 12 via line 26.

A light, substantially vapor fraction comprising primarily hydrogen fluoride, some fluorosulfonic acid and a small amount of $SO_2$ formed from oxidative side reaction flashes and is removed from hydrolysis zone 12 via line 13. The hydrogen fluoride in the fraction removed via line 13 results not only from any hydrogen fluoride originally present in the spent catalyst and that formed by hydrolysis of the fluorosulfonic acid, but in addition, arises from decomposition of alkyl fluorosulfonates and other organofluoro compounds formed in the alkylation reaction.

A second, liquid fraction comprising the residual material from zone 12 and containing substantially all of the sulfuric acid present in the spent catalyst, plus residual fluoride compounds (preferably $\lt$ 100 ppmw as HF), acid oils, water and other impurities is removed from hydrolysis zone 12 via line 14 and transferred to adsorption zone 15. Adsorption zone 15 is the secondary treatment stage of the process and conveniently employs a vessel, preferably agitated, into which is introduced a fluidizable silica-alumina cracking catalyst via line 16. In adsorption zone 15, residual fluoride compounds in the liquid phase spent catalyst fraction removed from hydrolysis zone 12, chemically react with the silica-alumina to form insoluble fluoride compounds, or undergo physiochemical interaction, such as chemisoprtion, with the silica-alumina, and are substantially separated from the spent liquid sulfuric acid. The fluorided silica-alumina cracking catalyst is removed from the adsorption zone 15 via line 17.

A liquid acid effluent stream containing substantially all of the sulfuric acid present in the spent catalyst and preferably having a fluoride content, as HF, of <10 ppmw is removed from adsorption zone 15 via line 18 and fed to sludge conversion unit 19. In sludge conversion unit 19, the spent sulfuric acid, having a greatly reduced fluoride content, is combusted in a suitable furnace under conditions such that all the sulfur species present in the catalyst are converted to sulfur dioxide. The sludge conversion unit further contains a converter section employing an oxidation catalyst such as $V_2O_5$ which, in the presence of air, converts the $SO_2$ into $SO_3$. Part of the $SO_3$ thus produced is absorbed in a fresh sulfuric acid solution to form oleum which is then diluted with water to form 97-99 weight percent sulfuric acid. The sulfuric acid thus produced is removed via line 20 for recycle to alkylation unit 10.

The light fraction removed from zone 12 via line 13 comprising hydrogen fluoride, fluorosulfonic acid and $SO_2$, is introduced into fluorosulfonic acid regeneration unit 27 and combined with $SO_3$, to convert the HF to additional fluorosulfonic acid. A portion of the $SO_3$ in unit 27 may be obtained from unit 19 via line 22. Any additional $SO_3$ needed to convert the hydrogen fluoride to fluorosulfonic acid can be obtained from $SO_3$ make-up stream 23. The regenerated fluorosulfonic acid stream exits unit 27 via line 28. The $SO_2$ present in the fluorosulfonic acid stream is removed from line 28 via line 24 to provide a stream comprising substantially fluorosulfonic acid. The fluorosulfonic acid is then combined with the sulfuric acid from line 20 in the proper proportions to form fresh alkylation catalyst which is fed to alkylation unit 10 via line 25.

While reference has been made to the use of a multistage stirred vacuum digester in hydrolysis zone 12, it is to be understood that other types of equipment can be employed. The purpose of the primary treatment stage or hydrolysis zone is to remove the relatively volatile hydrogen fluoride from the spent catalyst. Thus, any means which will provide a large surface area of spent alkylation catalyst to allow efficient flashing of the hydrogen fluoride can be used. For example, rotary film evaporators, packed trickle towers, spray towers, baffle towers, rotary disc contactors, etc, can be employed.

Preferably, the process in the hydrolysis zone, i.e. the primary treatment stage, comprises distillation at subatmospheric pressure and at elevated temperatures. Pressures in the distillation zone should be as low as economically practical and preferably below about 1 psia. Temperatures will, of course, depend on the pressures, but generally will range from about 50° to about 120° C., and preferably from about 80° to 110° C. It has been found that if the spent alkylation catalyst is subjected to temperatures of 125° C. or higher for extended periods of time, the catalyst tends to thicken to a semi-solid mass. Thus, the temperatures should be kept below about 125° C. For a typical spent alkylation catalyst containing 15,000 to 30,000 ppmw fluoride as HF, it has been found that if the hydrolysis zone is maintained at a temperature of around 100° C. and a pressure of about or below 1 psia, and under conditions affording increased surface area of the spent catalyst, 90% recovery, by weight, of fluoride (calculated as HF) can be achieved without adverse degradation side reactions which occur at higher temperatures.

The residence time in the hydrolysis zone will vary depending on pressure, temperature, fluoride content of the spent acid, water content, etc. Generally speaking, residence time of the spent catalyst in the hydrolysis zone should be sufficient to permit maximum hydrolysis of the fluorosulfonic acid to hydrogen fluoride and subsequent flashing of the hydrogen fluoride and/or remaining fluorosulfonic acid from the distillation zone. Additionally, relatively long residence times in the hydrolysis zone promote the decomposition of organofluoro compounds in the spent catalyst into hydrogen fluoride and/or fluorosulfonic acid for recycle to the alkylation unit and minimizing the fluoride removal needed in the second stage of the process.

However, while long residence times increase the fluoride recovery from the spent catalyst in the hydrolysis zone, there is also a concomitant increase in the amount of $SO_2$ recovered in the vapor fraction with the hydrogen fluoride. Since $SO_2$ losses represent loss of sulfur for regeneration into fresh sulfuric acid, minimum digestion or residence time in the distillation zone consistent with adequate fluoride removal should be used so as to minimize such losses. In general, it has been found that at a temperature of about 100° C. and a pressure of about 1 psia or lower, a residence time of 4 hours or greater will effect removal of 90% by weight of the total fluoride, calculated as HF, from a typical spent catalyst, i.e. containing 15,000-30,000 ppmw fluoride. In such a typical spent catalyst, if the digestion time is increased to 6 hours or greater, as for example, from about 6 to about 8 hours, greater fluoride removal (about 97% by weight) can be obtained, e.g. from about 23,000 ppmw to about 700-800 ppmw. It has also been found that if the spent alkylation catalyst has a relatively low initial fluoride concentration, e.g. about 1000-1500 ppmw, calculated as HF, the fluoride level can be reduced to 74 ppmw after 2 hours and 33 ppmw after 8 hours. With ample residence time and at a temperature of around 100° C. and a pressure of 5-15 mm. Hg, the fluoride content (as HF) of a typical spent acid catalyst can be reduced to 100 ppmw or less.

While the distillation step of the process of the present invention can be conducted in the presence of the amount of water needed to stoichometrically react with the fluorosulfonic acid to form hydrogen fluoride, it has been found that higher water content in the spent catalyst greatly improves fluoride recovery in the distillation zone. As noted, typical spent catalyst contains 3-4% by weight water which is sufficient, a noted above, to effect good recovery of fluoride from spent catalyst in the distillation zone. However, when the water content of the spent catalyst contains up to 8% by weight water, and more preferably from about 8 to about 15% by weight water, the volatility of the fluorides in the spent acid is greatly increased. Apparently, the excess water is needed to (1) force the hydrolysis of the fluorosulfonic acid to HF which is more volatile, and/or (2) reduce the solubility of the HF in the spent acid catalyst. Indeed, the presence of approximately 15 weight percent water in the spent catalyst will permit reduction of the fluoride content (calculated as HF) from about 24,000 ppmw, to about 50 ppmw after only 8 hours residence time in the distillation zone.

It is also possible to employ inert gas purging or stripping of the spent acid catalyst in the distillation zone. Thus, purge gases such as $N_2$, argon, helium, etc. could be used. Moreover, steam stripping could be employed, the steam serving the added purpose of supplying water to the system.

In the secondary treatment stage, i.e. the adsorption zone, of the process of the present invention, the residual fluoride compounds in the spent alkylation catalyst are contacted with the solid fluidizable silica-alumina cracking catalyst in an amount and for a period of time sufficient to effect reaction between at least a portion of the fluoride compounds and the alumina. Fresh or spent silica-alumina cracking catalysts which contain varying amounts of alumina can be employed. The actual amount of cracking catalyst which must be used in the adsorption zone to effect efficient removal of the residual fluoride compounds, will depend upon the fluroide content of the spent catalyst liquid fraction removed from the hydrolysis zone, temperature conditions, contact times, etc. Thus, for example, silica-alumina cracking catalyst containing as little as 10% by weight alumina has been found to be effective in the adsorption zone to remove the residual fluoride compounds.

The total amount of silica-alumina cracking catalyst used in the adsorption zone will vary depending upon the fluoride content of the spent acid catalyst, temperature conditions, contact times, surface area of the cracking catalyst, etc. However, in general, when the alumina content of the cracking catalyst is 10 weight percent or greater, the amount of cracking catalyst used will range from about 0.3% by weight and higher of the spent alkylation catalyst fraction in the adsorption zone. While higher concentrations of cracking catalyst, e.g. up to 5% by weight reduce the time required to effect removal of the residual fluoride to a given level, the reduction in the ultimate fluoride concentration is not significantly reduced. It has also been found that for substantially the same total amount of cracking catalyst used, multiple additions of the cracking catalyst are more effective than a single addition of the cracking catalyst. Thus, for example, a single charge of 1% by weight silica-alumina cracking catalyst with a contact time of 4 hours and a temperature of 100° C. is less effective than two additions of 0.5% by weight the same cracking catalyst at 2 hour intervals and a temperature of 100° C. The use of a spent silica-alumina cracking catalyst (36 weight percent $Al_2O_3$, 70% 40–80 micron size) in an amount of from about 1 to about 3% by weight of the spent catalyst in the absorption zone, at a temperature of around 100° for a contact time of from about 6 to about 8 hours will reduce the fluoride content (calculated as HF) of the spent acid in the adsorbent zone from about 1900 ppmw to 10 ppmw or less.

It will be apparent that to effect efficient removal of the residual hydrogen fluoride or other fluoro compounds in the spent alkylation catalyst fraction in the adsorption zone, there must be sufficient contact time between the spent catalyst and the silica-alumina cracking catalyst. The actual contact or residence time required will depend upon several variations, such as for example, particle size of the cracking catalyst, the alumina content, surface area of the cracking catalyst, the fluoride content of the spent alkylation fraction catalyst, the temperature, etc. Accordingly, no specific residence time can be stated. However, it has generally been found that when the contacting is carried out at an elevated temperature as, for example, approximately 100° C., a residence time of 1 hour or greater, e.g. 2 to 4 hours, is required to obtain maximum reduction in the fluoride level.

Spent silica-alumina cracking catalyst (particle size 40–80 microns) having a relatively large surface (approximately 100 m²/g) provides much greater contact area for reduction of the hydrogen fluoride or other fluoro compounds than a material e.g. bauxite, of much larger particle size, e.g > 200 microns. Thus, an alumina containing material of relatively large particle size requires a much longer residence time to effect the desired reduction in the fluoride content. The use of a silica-alumina cracking catalyst of relatively fine particle size (< 100 microns) generally requires centrifuging, filtering or some other such solid-liquid separation step to achieve removal of the fluorided cracking catalyst from the spent alkylation catalyst.

While the adsorption process can be conducted at ambient and even below ambient temperatures, the rate of reaction of the fluoro compounds, particularly hydrogen fluoride, with the silica-alumina cracking catalyst is greatly enhanced at elevated temperatures. Generally speaking, a temperature range of from about 50° to about 120° C. promotes effficient reaction between the hydrogen fluoride or other fluoro compounds and the alumina, a temperature of around 100° C. being particularly desirable.

The adsorption process can be conducted at pressures ranging from subatmospheric to super-atmospheric However, sub-atmospheric or super-atmospheric pressures appear to have no significant effect on the efficiency of the adsorption process and accordingly, from an economy standpoint, it is convenient to carry the adsorption process out at atmospheric pressure.

As described above, the process of the present invention also provides a method for regeneration of fresh alkylation catalysts. The hydrogen fluoride which is removed in the primary treatment stage can be reacted with sulfur trioxide to form fluorosulfonic acid which together with the fluorosulfonic acid removed in the hydrolysis zone can be employed as one of the components of fresh alkylation catalyst. Likewise, the substantially fluoride free spent sulfuric acid fed to the sludge conversion unit is ultimately used to generate fresh sulfuric acid, thus providing the other component of the alkylation catalyst. The sludge conversion unit can also provide at least a portion of the sulfur trioxide used to react with the hydrogen fluoride recovered from the primary treatment stage to form the fluorosulfonic acid. In forming the fresh alkylation catalyst, the fluorosulfonic acid and sulfuric acids are combined in a weight ratio of from about 0.11/1 to about 0.32/1, respectively, to form an acid catalyst. The fresh catalyst may, in addition, contain up to 3% by weight water.

The process of the present invention not only provides an efficient method for the recovery of the fluorosulfonic acid from the spent alkylation catalyst, but in addition, provides a spent sulfuric acid feed for the sludge conversion unit which is substantially free of deleterious amounts of fluoride. As previously noted, the sludge conversion unit employs a refractory lined furnace which is readily attacked by hydrogen fluoride. Accordingly, to avoid damage to the refractory, it is necessary that the hydrogen fluoride content of the feed be reduced as much as possible, if not eliminated. Additionally, removal of the fluoride from the spent acid ensures that the sulfur dioxide produced in the sludge conversion unit will be substantially free of fluoride compounds which could voltalize the vanadium in the $V_2O_5$ oxidation catalyst used to convert the $SO_2$ to $SO_3$.

To further illustrate the advantages of the present invention, the following non-limiting examples are presented. All fluoride contents are by weight and calculated as HF unless otherwise indicated.

EXAMPLE I

A 200 ml. sample of spent alkylation acid catalyst containing 23,600 ppm fluoride was placed in a one-liter stirred reactor maintained at 100° C. and 5–15 mm. Hg absolute pressure for 8.5 hours, the evolving HF and $HFSO_3$ being collected. Periodic analysis of the spent acid catalyst showed 40% of the fluoride had been removed after 4 hours, a fluoride content residual of 1530 ppm after 6.5 hours, and 780 ppm after 8.5 hours.

EXAMPLE II

The procedure of Example I was followed except the spent alkylation catalyst was admixed with an amount of water equal to 5% by weight of the spent acid catalyst in the reactor which brought the total water content of the spent acid catalyst to about 8–9% by weight. It was found that after 8 hours of digestion (distillation), the spent acid catalyst had a residual fluoride content of 450 ppm.

EXAMPLE III

The procedure of Example II was followed with the exception that an amount of water equal to 10 weight percent of the spent acid catalyst was added bringing the total water content of the spent catalyst in the reactor to about 13–14%. It was found that after 8 hours of digestion, the spent acid catalyst had a residual fluoride content of 50 ppm.

EXAMPLE IV

A 17.4 gram sample of the residual spent acid from Example I having a fluoride content of ≈ 800 ppm was mixed with 0.053 grams of a spent silica-alumina cracking catalyst (70% 40–80 micron size, 36.1% $Al_2O_3$) and heated in a polyethylene bottle at 100° C. for 2 hours with occasional shaking. An additional 0.102 grams of the spent silica-alumina catalyst was added to make the total adsorbent content of the mixture 0.90% by weight and the mixture heated at 100° C. for an additional 2 hours. Upon cooling, the slurry was centrifuged to remove the fluorided adsorbent (aluminum fluoride). Analysis of the thus treated spent acid showed a fluoride concentration of 13 ppm.

EXAMPLE V

A 17.4 gram sample of the residual spent acid from Example I was mixed with 0.0989 grams of the spent silica-alumina cracking catalyst described in Example II and heated at 100° C. for 4 hours as described in Example II. An additional 0.09609 grams of silica-alumina catalyst was then added to make the total adsorbent content 1.1% by weight of the total mixture, and the heating continued for an additional 4 hours. Following centrifugation, the liquid phase was found to contain 10 ppm fluoride.

EXAMPLE VI

A 12.37 gram sample of spent alkylation catalyst which had been treated as per the general process of Example I was contacted with 8 hours at 100° C. with 0.9 weight% chromatographic grade acidic alumina (passes 80 mesh screen). Analysis of the effluent acid showed that the fluoride concentration had been reduced from 780 to 475 ppm during the adsorption treatment.

EXAMPLE VII

A 200 ml. sample of spent alkylation acid catalyst processed as per the general method of Example 1 and containing 62 ppm fluoride was treated with 5 weight % chromatographic grade alumina (passes 80 mesh screen) at 100° C. for 6 hours. Analysis of the effluent acid showed the fluoride level was reduced to 3 ppm.

EXAMPLE VIII

A 17.4 gram sample of spent alkylation acid catalyst treated as per the general method of Example I and containing 780 ppm fluoride was contacted with 1.18 weight % Porocel (activated bauxite) at 100° C for 8 hours. The effluent acid was found to contain 530 ppm fluoride. A similar run but employing 4.5 weight % Porocel (10–30 mesh) reduced the fluoride concentration to 246 ppm.

EXAMPLE IX

A sample of residual spent acid catalyst obtained generally as per the procedure of Example I and containing approximately 1530 ppm fluoride was mixed with 0.6 weight % of the silica-alumina catalyst described in Example IV and heated at 100° C. with occasional shaking. It was found that the fluoride level was reduced to 50 ppm within 1 hour, the fluoride content being reduced to 11 ppm within 3 to 4 hours.

EXAMPLE X

Various alumina containing materials were used to treat spent alkylation acid catalyst which had been subjected to the primary distillation step. In all cases, contacting between the adsorbent and the spent acid was conducted at 100° C. at atmospheric pressure for a period of 8 hours. The results are shown in Table 1 below.

Table 1

| | ADSORPTION OF FLUORIDE IN SPENT ACID BY VARIOUS ALUMINAS | | | |
|---|---|---|---|---|
| Run No. | Alumina Code[1] | Wt.% Adsorbent | Initial ppm F | Final ppm F |
| 1 | 1 | 0.67 | 780 | 78 |
| 2 | 1 | 1.12 | 780 | 10 |
| 3 | 2 | 0.90 | 780 | 475 |
| 4 | 2 | 4.86 | 62 | 3 |
| 5 | 2 | 6.80 | 33 | 9 |
| 6 | 3 | 0.56 | 780 | 525 |
| 7 | 3 | 4.49 | 780 | 246 |

[1]Code 1 - Spent slica-alumina cracking catalyst (70% 40–80 micron size, 36.1 wt.% $Al_2O_3$).
Code 2 - Acidic alumina powder (Brockmann Activity Grade 1).
Code 3 - 10–30 mesh Porocel (activated bauxite).

EXAMPLE XI

Distillates obtained following the general procedure of Example I from two samples of spent acid were collected in a liquid $N_2$ cooled trap, warmed to 0° C., and mixed with liquid $SO_3$. The resulting solutions were distilled at reduced pressure to purify the fluorosulfonic acid. The data for regeneration of the fluorosulfonic acid is given in Table II below.

Table II

| Run. No. | 1 | 2 |
|---|---|---|
| Spent Acid Charged, gms | 340 | 324 |
| Initial F Conc., ppm | 25,600 | 25,600 |
| Initial $H_2O$ Conc., wt % | 2.4 | 2.4 |
| Organics, wt. % $CH_2$ | 5.13 | 5.13 |
| $H_2O$ Added Durinhg Digestion, wt. % | 10.0 | 5.0 |

Table 11-continued

| Run. No. | 1 | 2 |
|---|---|---|
| Final H₂O Conc., Wt % | 13.0 | 10.7 |
| Final F Conc. (after seven hours digestion), ppm | 25 | 594 |
| Distilled HFSO₃, gms | 31.8 | 30.3 |
| Boiling Pt., a ° C | 70–73 at 2.9 kPa (22 mm. Hg) | 75 at 3.3 kPa (25 mm. Hg) |
| F, wt. % | 20.0 | 23.6 |
| Purity Basis Titratable Acidity (after hydrolysis to HF + H₂SO₄), wt. % HFSO₃ | | |
| Recovery as HFSO₃, wt. % (basis F content of spent acid) | 69 | 69 |
| Overall F Balance, wt. % | 85 | 75 |
| HFSO₃/(HFSO₃ + Heavy Ends) | 0.85 | 0.85 |

$^a$Lit. B.P. Data 77°C. at 2.5 kPa (19 mm. Hg) - Kirk-Othmoer Encyclopedia of Chem. Tech., 2nd Ed., Vol. 9, p. 676 (1966).

As can be seen from the data above, the process of the present invention provides an efficient method, improved over processes of the prior art, for the removal of fluoro compounds from spent alkylation catalysts comprising sulfuric acid and fluorosulfonic acid.

With reference to Examples I–III it can be seen that the hydrolysis step effects substantial removal of fluoro compounds from spent alkylation catalysts comprising sulfuric acid and fluorosulfonic acid. In Example I, hydrolysis of spent sulfuric acid-fluorosulfonic acid alkylation catalyst, in the presence of about a stoichiometric amount of water for conversion of fluoride compounds to hydrogen fluoride, results in conversion of a major portion of the fluoro compounds to hydrogen fluoride which is separated as a vapor fraction. Examples II and III demonstrate that, by increasing water content of the spent alkylation acid substantially above the stoichiometric amount required for conversion of fluoro compounds, removal of such fluoro compounds from the spent alkylation catalyst can be substantially improved in the hydrolysis step.

Examples IV, V and IX demonstrate the effectiveness of spent silica-alumina cracking catalysts for removal of fluoro compounds from such sulfuric acid effluents. Comparing results obtained using these spent cracking catalysts against results using other alumina containing absorbents, such as chromatographic alumina powder and Porocel as in Examples VI through VIII, clearly points-up the advantage of using the spent silica-alumina cracking catalysts. For sulfuric acid solutions, residual fluoro compounds are removed more completely in less contact time using silica-alumina cracking catalyst, as compared to fluoro compound removal with other alumina containing absorbents.

With reference to Example XI, it is to be observed that the process herein provides an efficient method of regenerating fluorosulfonic acid from the spent catalyst. Note that overall fluoride balances of 75 and 85% were observed for the two runs.

It can be seen that by employing the process of the present invention, potential damage to the refractory lining in the furnace of the sludge conversion unit, and any loss of the V₂O₅ oxidation catalyst by fluoride vaporization of the vanadium can be virtually eliminated.

The present invention has been described with reference to several specific embodiments thereof, and accordingly, it will be apparent that many modifications, substitutions, and omissions will be readily suggested to a person of ordinary skill in the art without departing from the spirit of the present invention. Therefore, it is to be understood that the scope of the invention is to be determined solely by the claims appended hereto.

We claim:

1. A process for the removal of fluoro compounds from spent sulfuric acid-fluorosulfonic acid alkylation catalyst, wherein said fluoro compounds comprise about 15,000–30,000 ppmw, calculated as HF, of said spent catalyst; which process comprises:
   a. reacting, in a hydrolysis zone, said spent catalyst, at sub-atmospheric pressure, at a temperature in the range of from about 50° to about 120° C in the presence of at least; about 3 weight percent water for a period in the range of about 1–8 hours, for production of a first vapor phase comprising mainly hydrogen fluoride and a first liquid phase comprising sulfuric acid, and containing about 800 ppm or less fluoro compounds;
   b. contacting, in an adsorption zone, said first liquid phase with a fluidizable silica-alumina cracking catalyst in an amount equivalent to about 0.3–5 weight percent of said first liquid phase for a period of time in the range of about 1–8 hours, at a temperature in the range of about 50°–120° C for production of a second liquid phase comprising said cracking catalyst containing fluoro compounds; and
   c. separating, in a solid-liquid separation zone, said second liquid phase from said first solid phase for production of an effluent acid containing the greater part of said sulfuric acid present in said spent catalyst and containing about 10 ppmw or less fluoride compounds.

2. The process of claim 1 wherein the reaction of hydrolysis step a is conducted at a pressure of about 1 psia or less, at a temperature in the range of about 30°–110° C., and in the presence of from about 8 to about 15 weight percent water, for a period of from about 4 to about 8 hours, for reducing residual fluoride content of said first liquid phase to about 100 ppmw or less, calculated as hydrogen fluoride.

3. The process of claim 2 wherein the first liquid phase and a first portion of said fluidizable silica-alumina cracking catalyst are charged to the adsorption zone at the beginning of this adsorption step (b), and wherein a second portion of said cracking catalyst is added to the adsorption zone after a period of about 2 hours, for increased reduction of fluoride compounds in the effluent acid.

4. A process for the regeneration of spent sulfuric acid-fluorosulfonic acid alkylation catalyst containing about 15,000–30,000 ppmw, calculated as HF, fluoro compounds, which process comprises:
   a. reacting, in a hydrolysis zone, said spent alkylation catalyst, at subatmospheric pressure, at a temperature in the range of from about 80° to about 110° C in the presence of of about 3–15 weight percent water for a period in the range of about 4–8 hours, for production of a first vapor phase comprising mainly hydrogen fluoride and a first liquid phase comprising sulfuric acid and containing about 800 ppm or less residual fluoro compounds;

b. flowing said first vapor phase overhead from said hydrolysis zone into a fluorosulfonic acid generation zone;

c. treating said first vapor phase with sulfur trioxide to form regenerated fluorosulfonic acid from said hydrogen fluoride present in said first vapor fraction;

d. flowing said first liquid phase from said hydrolysis zone into an adsorption zone;

e. contacting, in said adsorption zone, said first liquid phase with a fluidizable silica-alumina cracking catalyst in an amount equivalent to about 0.3–5.0 weight percent of said first liquid phase for a period of time in the range of about 1–8 hours, at a temperature in the range of about 50°–120° C sufficient to react a major portion of said residual fluoro compounds with said cracking catalyst for production of a second liquid phase comprising sulfuric acid and containing 10 ppm or less fluoro compounds;

f. separating, in a solid-liquid separation zone, said second liquid phase from said cracking catalyst for production of an effluent acid free of cracking catalyst, comprising sulfuric acid and containing about 10 ppmw or less fluoro compounds;

g. combusting said effluent acid to convert said sulfuric acid to sulfur dioxide;

h. converting at least a portion of said sulfur dioxide to sulfur trioxide;

i. absorbing a portion of said sulfur trioxide from step (h) into a sulfuric acid solution for production of regenerated sulfuric acid;

j. flowing a portion of said sulfur trioxide from step (h) to said fluorosulfonic acid regeneration zone of step (c); and k. combining said regenerated fluorosulfonic acid with said regenerated sulfuric acid acid in a weight ratio of from about 0.11/1 to about 0.32/1 respectively to produce fresh alkylation catalyst.

5. The process of claim 4 wherein said reaction in said hydrolysis zone is conducted at a pressure of about 1 psia or lower in the presence of from about 8 to about 15 weight percent water.

* * * * *